Feb. 11, 1947. W. HIETALA 2,415,633
AUTOMATIC WEEDLESS FISH LURE
Filed May 20, 1944
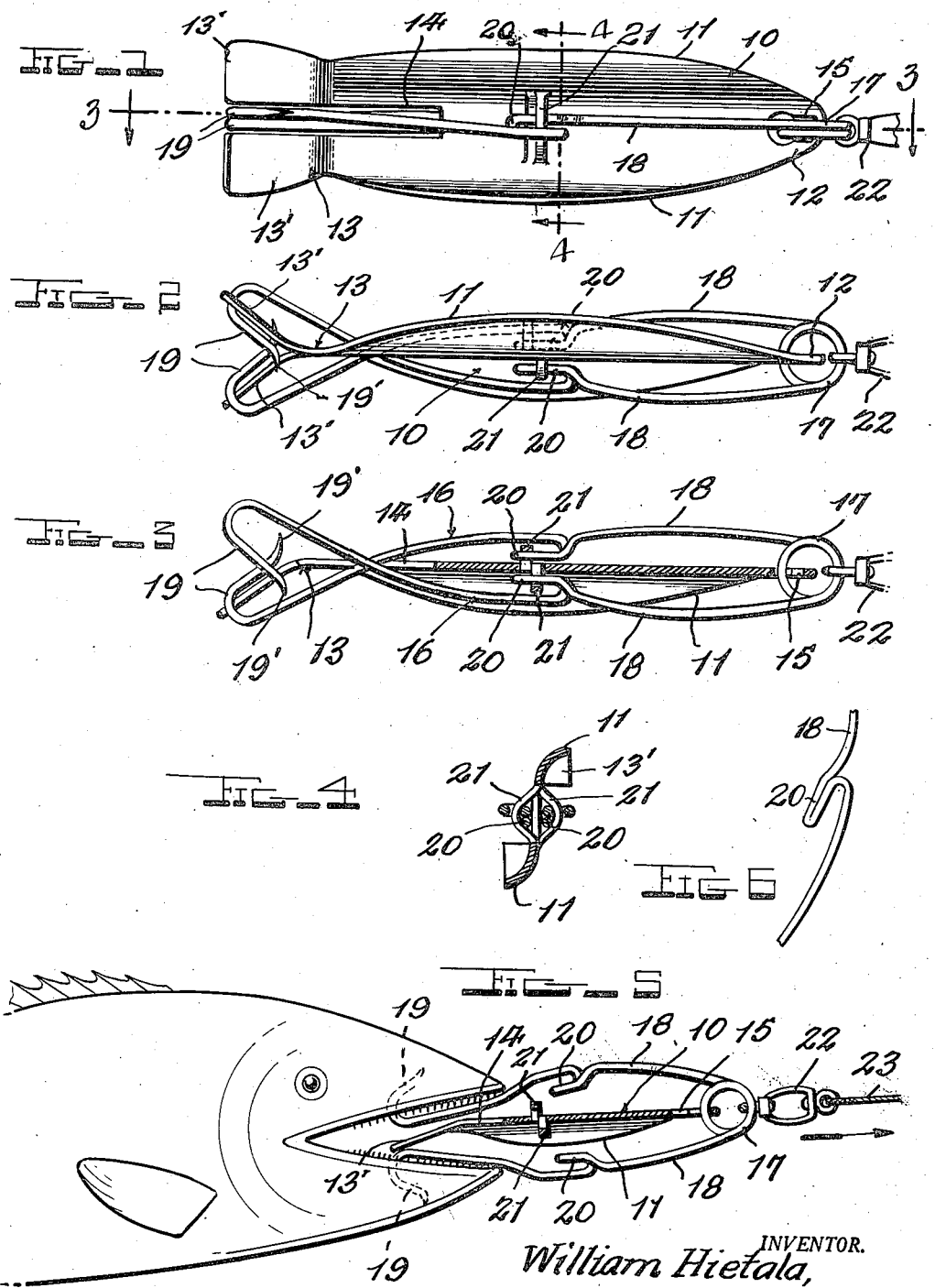
INVENTOR.
William Hietala,
BY
Christian L. Nielsen.
ATTORNEY

UNITED STATES PATENT OFFICE 2,415,633

AUTOMATIC WEEDLESS FISH LURE

William Hietala, Maple, Wis.

Application May 20, 1944, Serial No. 536,552

1 Claim. (Cl. 43—35)

This invention relates to an automatic weedless fish lure and it consists in the constructions, arrangements and combinations herein described and claimed.

It is an important object of the invention to provide a fishing lure wherein the hooks employed are correlated to a spoon device in such manner as to partly enclose the hooks when in set position, so that liability of the latter from becoming entangled with grass or debris is overcome.

It is also an object of the invention to provide a fish lure of extreme simplicity, and in which a novel detent means is provided between the spoon and the hooks for maintaining the latter in set position, yet readily releasable to engage within the mouth of a fish by a pull on the fishing line connected with the spoon.

More specifically, it is an object of the invention to provide a fish lure upon which a pair of spring-urged hooks are mounted, adapted to move in opposite directions upon release of a detent means to firmly engage within the mouth of a fish which has grasped the lure.

Additional objects, advantages and features of invention will be apparent from the following description, and accompanying drawing, wherein Figure 1 is a top plan view of the lure in set position.

Figure 2 is a side elevation thereof.

Figure 3 is a longitudinal sectional view on the line 3—3 of Figure 1.

Figure 4 is a cross section on the line 4—4 of Figure 1.

Figure 5 is a longitudinal sectional view of the lure in sprung or operative position to dispose the hooks within the mouth of the fish.

Figure 6 is an enlarged detail view of one of the trigger members.

In carrying out the invention I provide an elongated body member 10 shaped somewhat to simulate a minnow or the like. The body is formed from a flat sheet material, and the longitudinal edges 11 of the body are oppositely curved, as clearly shown in Figure 4, the curvatures extending from adjacent the front end 12 of the lure to points inwardly of the tail end 13. The tail 13 of the lure is provided with a longitudinally extended slot 14 and the tail portions 13' at opposite sides of the slot are bent upwardly and downwardly beyond the longitudinal axis of the body, as clearly shown in Figures 2 and 3.

At the front or head end of the body of the lure, a key hole opening 15 is formed, positioned in the medial longitudinal axis of the body which functions for the mounting of dual hooks 16, as will now be described.

The hooks 16 are formed from a single strand of steel wire of suitable gauge, which is provided medially of the length of the wire with a helix 17 which may be readily threaded through the opening 15 by slight separation of the coils of the helix. The respective shanks 18 of the hooks are disposed longitudinally of the body 10 upon opposite sides thereof terminating in respective hooks 19 occupying a position within the slot 14. The hooks 19 are formed so as to present the points 19' in opposite directions and when the lure is in set operative position, the points 19' lie well within the oppositely bent tail portions 13'. By this construction it will be apparent that there is a minimum liability for the hooks to become fouled by grass, roots or other obstructions which quite often interfere with fish lures.

Intermediate the length of each of the shanks 18, the wire is bent to form an elongated trigger 20 complemental to a respective loop member 21 struck in opposite directions from the body 10.

Any suitable swivel 22 and line 23 may be connected to the helix 17, as will be understood.

To set the lure preliminary to casting, the helix 17 will occupy a position at the forward end of the opening 15, and it is now only necessary to compress the shanks 18 in the direction of the body until the respective triggers 20 are aligned with the loops 21. The hooks 19 will thus be disposed within the slot 14 and it is only necessary to move the body 10 in a longitudinal direction so as to engage the triggers and loops, the helix 17 now being in the rearmost position of the slot.

It will be readily understood that when the lure is drawn through the water by means of a line 23, the curvatures given the body 10 will impart motions simulating a swimming minnow, which will entice a fish to strike the lure. When this happens, a tug on the lure will release the triggers 20, releasing the shanks 18 imparting opposite movements of the hooks 19 for impalement of the points 19' within the mouth of a fish.

While I have shown and specifically described my lure, this is by way of illustration only, and I consider as my own all such modifications in construction as fairly fall within the scope of the appended claim.

I claim:

A fish lure comprising an elongated body member having a head portion and tail portion, said tail portion having a medial longitudinal slot extending inwardly from the end thereof the longitudinal edges of said body member having oppositely curved portions for a substantial distance of the length of the body, said head portion having an elongated opening, a dual hook means formed from a strand of steel wire and including a helix intermediate its length and mounted within said elongated opening, the helix including integral extensions forming shanks of respective hook members, said shanks being extended longitudinally of said body, upon opposite sides to dispose the hooks within the slot of the tail member in opposed relation, loop members on respective sides of the body member and each of said shanks having a trigger member complemental to a respective loop member, said helix being longitudinally movable in said elongated opening for release of said trigger member.

WILLIAM HIETALA.

REFERENCES CITED

The following references are of record in the file of this patent:

UNITED STATES PATENTS

| Number | Name | Date |
|---|---|---|
| 872,817 | Hipp | Dec. 3, 1907 |
| 985,659 | Clayton | Feb. 28, 1911 |
| 1,812,906 | Swearingen | July 7, 1931 |
| 1,338,058 | Peterson | Aug. 16, 1921 |
| 1,036,380 | Tileston | Aug. 20, 1912 |